US011745877B2

(12) United States Patent
Lin

(10) Patent No.: US 11,745,877 B2
(45) Date of Patent: Sep. 5, 2023

(54) BIPLANE FLYING DEVICE

(71) Applicant: Yao-Chang Lin, Hsinchu (TW)

(72) Inventor: Yao-Chang Lin, Hsinchu (TW)

( * ) Notice: Subject to any disclaimer, the term of this patent is extended or adjusted under 35 U.S.C. 154(b) by 129 days.

(21) Appl. No.: 17/348,771

(22) Filed: Jun. 16, 2021

(65) Prior Publication Data

US 2022/0332417 A1 Oct. 20, 2022

(30) Foreign Application Priority Data

Apr. 20, 2021 (TW) ................. 110114123

(51) Int. Cl.
| *B64C 39/08* | (2006.01) |
| *B64C 3/10* | (2006.01) |
| *B64C 3/32* | (2006.01) |
| *B64C 1/16* | (2006.01) |
| *B64C 5/02* | (2006.01) |
| *B64C 25/36* | (2006.01) |
| *B64C 9/00* | (2006.01) |
| *B64C 11/00* | (2006.01) |

(52) U.S. Cl.
CPC ............... *B64C 39/08* (2013.01); *B64C 1/16* (2013.01); *B64C 3/10* (2013.01); *B64C 3/32* (2013.01); *B64C 5/02* (2013.01); *B64C 9/00* (2013.01); *B64C 11/001* (2013.01); *B64C 25/36* (2013.01); *B64C 2009/005* (2013.01)

(58) Field of Classification Search
CPC ......... B64C 11/001; B64C 39/08; B64C 1/16; B64C 3/10; B64C 3/32; B64C 5/02; B64C 9/00; B64C 25/36; B64C 2009/005; B64C 15/02; B64C 29/02; B64C 39/068; B64C 25/34
See application file for complete search history.

(56) References Cited

U.S. PATENT DOCUMENTS

| 3,834,654 A * | 9/1974 | Miranda ............... B64C 39/068 244/45 R |
| 4,856,736 A * | 8/1989 | Adkins ................. B64C 39/068 244/45 R |
| 6,854,686 B2 * | 2/2005 | Perlo ..................... B64C 39/026 244/7 B |
| 9,499,266 B1 * | 11/2016 | Garreau .................... B64C 9/00 |
| 10,131,424 B2 * | 11/2018 | Fink ........................ B64C 25/10 |
| D844,538 S * | 4/2019 | Hernadi ...................... D12/345 |
| 10,464,668 B2 * | 11/2019 | Evulet .................... B64C 29/02 |
| D868,627 S * | 12/2019 | Evulet .......................... D12/319 |
| 10,518,880 B2 * | 12/2019 | Kimchi .................. B64C 27/26 |

(Continued)

FOREIGN PATENT DOCUMENTS

WO WO-2021138470 A1 * 7/2021 ............. B64C 27/26

*Primary Examiner* — Medhat Badawi

(57) ABSTRACT

A biplane flying device includes a fuselage, an upper wing, a lower wing, a first propulsion assembly and a second propulsion assembly. The upper wing is connected to one side of the fuselage. The upper wing has a first end and a second end opposite to each other. The lower wing is connected to the fuselage and opposite to the upper wing. The lower wing has a third end and a fourth end opposite to each other. The first end is opposite to the third end, and the second end is opposite to the fourth end. The first propulsion assembly is connected between the first end, the third end and the fuselage. The second propulsion assembly is connected between the second end, the fourth end and the fuselage.

8 Claims, 6 Drawing Sheets

(56) References Cited

U.S. PATENT DOCUMENTS

| | | | | |
|---|---|---|---|---|
| 10,661,893 B2* | 5/2020 | Lin | | B64C 39/026 |
| 10,981,649 B2* | 4/2021 | LeGrand | | B64C 27/20 |
| D920,214 S * | 5/2021 | Oliveira | | D12/340 |
| 11,077,940 B2* | 8/2021 | Nilsen | | B64D 27/18 |
| 11,136,119 B2* | 10/2021 | LeGrand | | B64C 29/02 |
| 11,208,207 B2* | 12/2021 | Lloyd | | B64C 11/001 |
| 11,249,477 B2* | 2/2022 | LeGrand | | G05D 1/0072 |
| 11,485,490 B2* | 11/2022 | Petrov | | B64C 29/02 |
| 2004/0240998 A1* | 12/2004 | Ashworth | | B63H 1/28 |
| | | | | 416/179 |
| 2006/0192047 A1* | 8/2006 | Goossen | | B64C 29/0016 |
| | | | | 244/17.23 |
| 2006/0226281 A1* | 10/2006 | Walton | | B64C 27/20 |
| | | | | 244/17.23 |
| 2006/0231675 A1* | 10/2006 | Bostan | | B64C 27/20 |
| | | | | 244/12.1 |
| 2007/0215746 A1* | 9/2007 | Rieken | | B64C 39/06 |
| | | | | 244/45 R |
| 2009/0224095 A1* | 9/2009 | Cox | | B64C 27/20 |
| | | | | 244/17.23 |
| 2010/0224721 A1* | 9/2010 | Wood | | B64C 39/068 |
| | | | | 244/12.3 |
| 2011/0042509 A1* | 2/2011 | Bevirt | | B64C 29/0033 |
| | | | | 244/12.4 |
| 2012/0043413 A1* | 2/2012 | Smith | | B64C 29/0033 |
| | | | | 244/12.4 |
| 2016/0031555 A1* | 2/2016 | Bevirt | | B64C 27/08 |
| | | | | 244/7 C |
| 2017/0066531 A1* | 3/2017 | McAdoo | | H02K 7/1815 |
| 2017/0369163 A1* | 12/2017 | Carlin | | B64C 11/48 |
| 2018/0029704 A1* | 2/2018 | Milani | | B64C 29/0033 |
| 2018/0334243 A1* | 11/2018 | Lin | | B64D 35/04 |
| 2018/0334252 A1* | 11/2018 | Lin | | B64D 35/04 |
| 2018/0354613 A1* | 12/2018 | Cvrlje | | B64D 27/24 |
| 2021/0095616 A1* | 4/2021 | Lin | | B64D 27/18 |
| 2022/0332417 A1* | 10/2022 | Lin | | B64C 39/08 |
| 2023/0053538 A1* | 2/2023 | Lin | | B64U 50/27 |

* cited by examiner

BIPLANE FLYING DEVICE

FIELD OF THE INVENTION

The present invention relates to a movable device, and more particularly to a biplane flying device.

BACKGROUND OF THE INVENTION

Flying into the sky is not only a human dream, but also an extremely efficient mode of transportation, which has the effect of reaching the destination quickly. Therefore, it can eliminate the barriers caused by space to people. In addition, flying is not only an entertainment and business nature, but also a great demand for other applications.

The fixed-wing aircraft can carry a large number of people and cargo. However, this type of aircraft requires a long runway and a large number of related take-off and landing equipment, so it is limited to take off and land at airports. To overcome this limitation, a rotorcraft, such as a helicopter, has been developed to take off and land vertically in a small area. However, even the rotorcraft can take off and land vertically, a considerable area of apron is still required, and the rotorcraft cannot be like a vehicle on the ground that can load and download passengers anywhere. In addition, in a metropolis with dense buildings, it is still difficult for helicopters to enter narrow lanes and ordinary building's roof. In addition, the maximum flying speed of a general helicopter is about 250 km/h, which is relatively low compared to flying devices, and therefore it cannot meet the requirements of some applications.

Therefore, the vertical lift aircrafts have been developed for use in densely-built and confined areas. However, the known vertical lift aircrafts have a low flying speed and a short flight range, and are limited in many applications, such as unable to meet the needs of transporting goods or carrying people. In general, such aircrafts are used for spraying pesticides or taking pictures.

SUMMARY OF THE INVENTION

The present invention provides a biplane flying device, which has the functions of vertical take-off and landing and horizontal high-speed flying, and has the advantages of strong structure, improved rigidity and stable flight attitude.

The biplane flying device provided by the present invention includes a fuselage, an upper wing, a lower wing, a first propulsion assembly and a second propulsion assembly. The upper wing is connected to one side of the fuselage. The upper wing has a first end and a second end opposite to each other. The lower wing is connected to the fuselage and opposite to the upper wing. The lower wing has a third end and a fourth end opposite to each other. The first end is opposite to the third end, and the second end is opposite to the fourth end. The first propulsion assembly is connected between the first end, the third end and the fuselage. The second propulsion assembly is connected between the second end, the fourth end and the fuselage.

In an embodiment of the present invention, the first end, the second end, the third end and the fourth end each have an arc-shaped wingtip structure. The arc-shaped wingtip structures at the first end and the third end are respectively bent toward the first propulsion assembly and connected to the first propulsion assembly. The arc-shaped wingtip structures at the second end and the fourth end are respectively bent toward the second propulsion assembly and connected to the second propulsion assembly.

In an embodiment of the present invention, the aforementioned biplane flying device further includes a first connecting member and a second connecting member. The first connecting member is connected between the fuselage and the first propulsion assembly. The second connecting member is connected between the fuselage and the second propulsion assembly.

In an embodiment of the present invention, the upper wing further has a chord line. The first propulsion assembly and the second propulsion assembly each have a central axis. There is an angle between the chord line and any of the central axes. The chord line rises in a direction away from the fuselage, wherein the direction is defined as from a trailing edge of the upper wing to a leading edge of the upper wing.

In an embodiment of the present invention, the angle is between 4 and 6 degrees. An angle of attack of 4 to 6 degrees can be naturally formed in horizontal flight to increase the lift of the wing.

In an embodiment of the present invention, the aforementioned biplane flying device further includes at least one wing-connecting member connected between the fuselage and the upper wing. The at least one wing-connecting member keeps a distance between the fuselage and the upper wing. The lower wing is directly connected to the fuselage.

In an embodiment of the present invention, the upper wing and the lower wing each have an airfoil. The airfoils each have a curve.

In an embodiment of the present invention, the outer part of the trailing edge of the upper wing can further be equipped with ailerons according to future control requirements.

In an embodiment of the present invention, the first propulsion assembly and the second propulsion assembly each includes a fan propeller and an air guide assembly. The air guide assembly is disposed at an exhaust port of the respective fan propeller. The fan propeller of the first propulsion assembly is connected between the first end, the third end and the fuselage. The fan propeller of the second propulsion assembly is connected between the second end, the fourth end and the fuselage.

In an embodiment of the present invention, the aforementioned biplane flying device further includes a tail wing. The tail wing and the lower wing are located on the same side of the fuselage, and the tail wing is located on a tail of the fuselage.

In an embodiment of the present invention, the aforementioned biplane flying device further includes a plurality of wheels disposed on the tail of the fuselage and the tail wing.

By being provided with not only the upper wing connected to the fuselage but also the lower wing connected to the fuselage, the biplane flying device of the present invention can have the advantage of stable flight attitude. In addition, the first propulsion assembly is connected to the fuselage, the first end of the upper wing and the third end of the lower wing, and the second propulsion assembly is connected to the fuselage, the second end of the upper wing and the fourth end of the lower wing; therefore, the biplane flying device of the present invention can also provide improved structural strength. In addition, the first end of the upper wing and the third end of the lower wing are closed by the first propulsion assembly, and the second end of the upper wing and the fourth end of the lower wing are closed by the second propulsion assembly; therefore, the vortex generated at the first end, the second end, the third end and the fourth end is reduced, thereby reducing the induced drag and increasing the lift of the upper and lower wings of the biplane flying device of the present invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
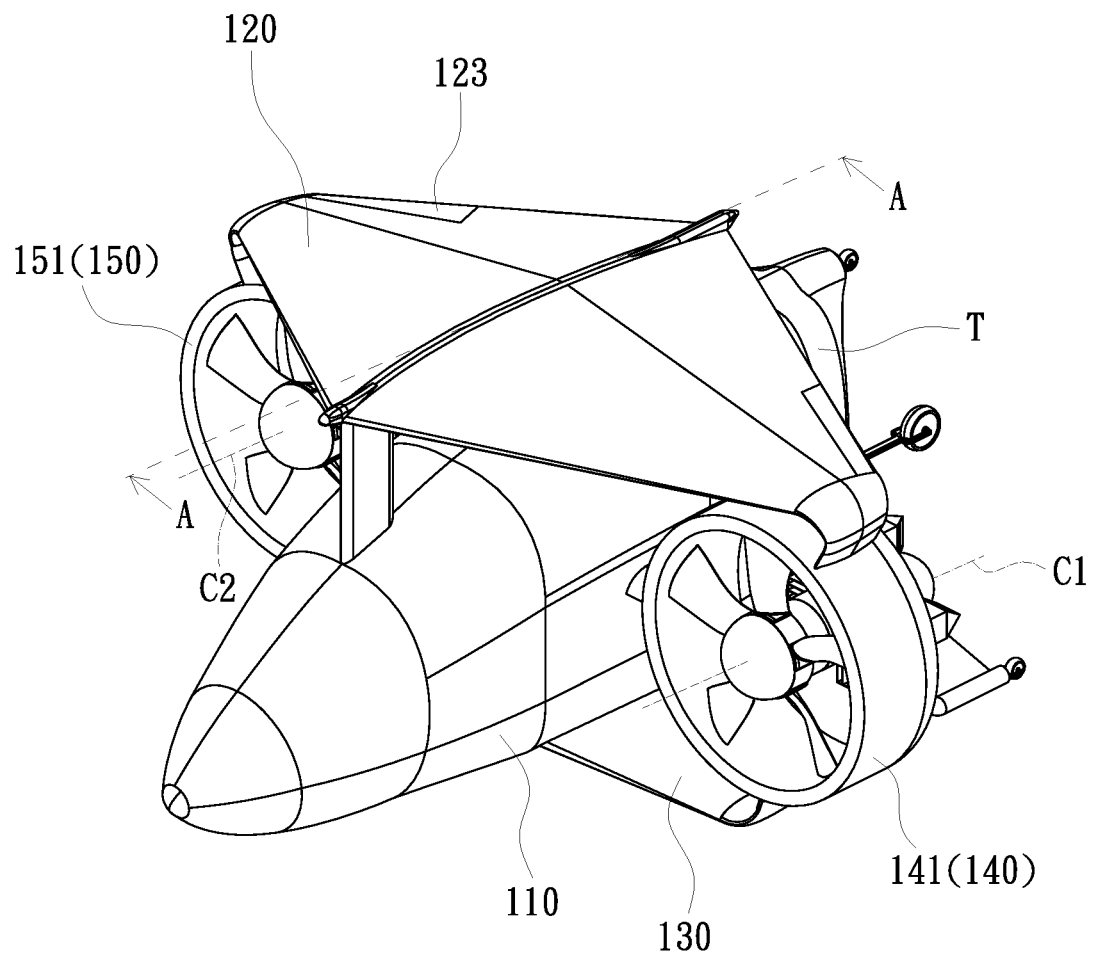
FIG. 1 is a three-dimensional schematic diagram of a biplane flying device according to an embodiment of the present invention.
Figure 2:
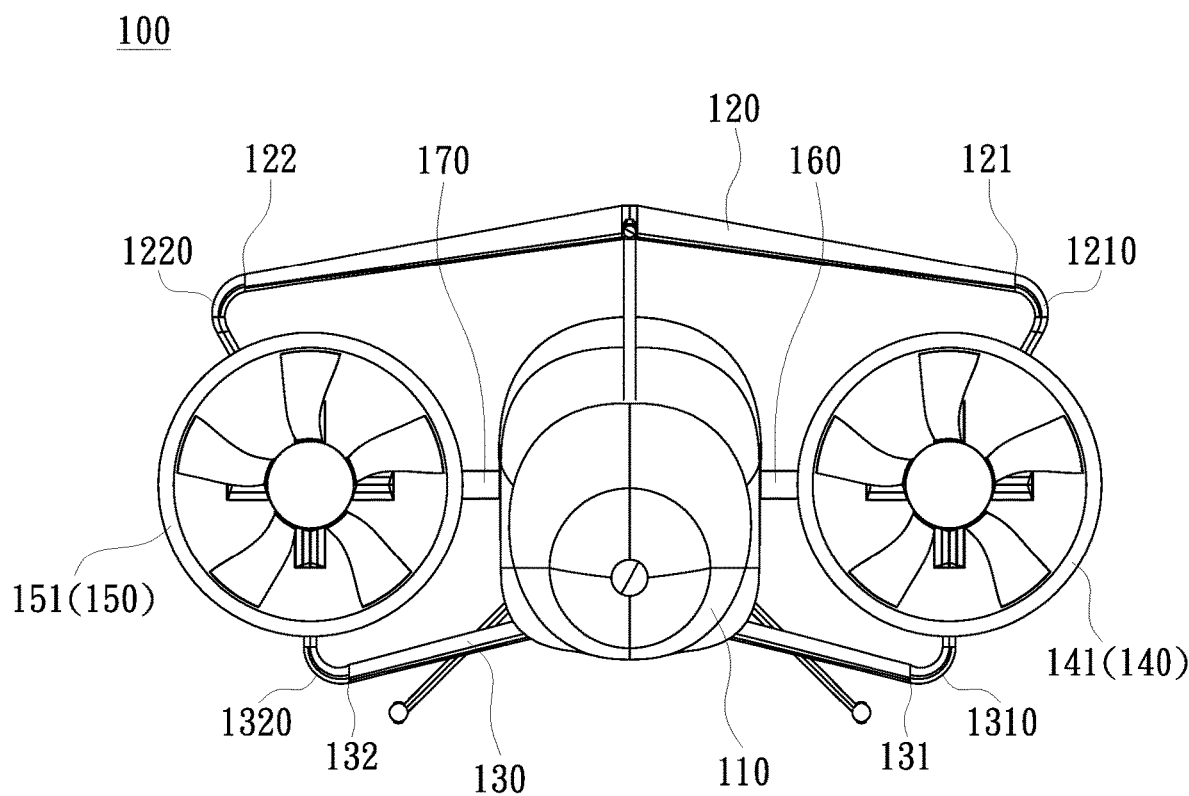
FIG. 2 is a schematic front view of the biplane flying device of FIG. 1.

FIG. 1 is a three-dimensional schematic diagram of a biplane flying device according to an embodiment of the present invention. FIG. 2 is a schematic front view of the biplane flying device of FIG. 1. Please refer to FIGS. 1 and 2. The biplane flying device 100 includes a fuselage 110, an upper wing 120, a lower wing 130, a first propulsion assembly 140 and a second propulsion assembly 150. The upper wing 120 is connected to one side of the fuselage 110 and has a first end 121 and a second end 122 (both shown in FIG. 2) opposite to each other. The lower wing 130 is connected to the fuselage 110 and opposite to the upper wing 120 and has a third end 131 and a fourth end 132 (both shown in FIG. 2) opposite to each other. The first end 121 is opposite to the third end 131, and the second end 122 is opposite to the fourth end 132. The first propulsion assembly 140 is connected between the first end 121, the third end 131 and the fuselage 110. The second propulsion assembly 150 is connected between the second end 122, the fourth end 132 and the fuselage 110.

An engine (not shown) connected to the first propulsion assembly 140 and the second propulsion assembly 150 may be disposed in the fuselage 110, so that the first propulsion assembly 140 and the second propulsion assembly 150 can provide power for the flight of the biplane flying device 100. In addition, a cockpit (not shown) may be disposed in the fuselage 110, but this embodiment is not limited thereto. In other words, the biplane flying device 100 of the present invention may be an unmanned flying device.

The upper wing 120 and the lower wing 130 of this embodiment may overlap each other, for example. However, the upper wing 120 and the lower wing 130 may partially overlap or be misaligned with each other in other embodiments. Incidentally, as shown in FIG. 1, the upper wing 120 may further be equipped with an aileron 123 on the outer part of its trailing edge according to future control requirements to improve the attitude controllability of the biplane flying device 100 in horizontal flight.

Please refer to FIGS. 1 and 2 again. The first end 121 of the upper wing 120 may have an arc-shaped wingtip structure 1210, and the second end 122 of the upper wing 120 may have an arc-shaped wingtip structure 1220. Similarly, the third end 131 of the lower wing 130 may have an arc-shaped wingtip structure 1310, and the fourth end 132 of the lower wing 130 may have an arc-shaped wingtip structure 1320. The arc-shaped wingtip structure 1210 of the first end 121 and the arc-shaped wingtip structure 1310 of the third end 131 are each bent toward the first propulsion assembly 140 and connected to the first propulsion assembly 140. Similarly, the arc-shaped wingtip structure 1220 of the second end 122 and the arc-shaped wingtip structure 1320 of the fourth end 132 are each bent toward the second propulsion assembly 150 and connected to the second propulsion assembly 150. Specifically, in this embodiment, the first propulsion assembly 140 may include a fan propeller 141, and the second propulsion assembly 150 may include a fan propeller 151. In other embodiments, the first propulsion assembly 140 and the second propulsion assembly 150 may include gas turbine propellers, but the present invention is not limited thereto. In this embodiment, the fan propeller 141 of the first propulsion assembly 140 is connected between the first end 121, the third end 131 and the fuselage 110, and the fan propeller 151 of the second propulsion assembly 150 is connected between the second end 122, the fourth end 132 and the fuselage 110. In addition, the biplane flying device 100 of this embodiment may further include a first connecting member 160 and a second connecting member 170 (both shown in FIG. 2). The first connecting member 160 is connected between the fuselage 110 and the first propulsion assembly 140, and the second connecting member 170 is connected between the fuselage 110 and the second propulsion assembly 150, so that the first propulsion assembly 140 and the second propulsion assembly 150 are respectively fixed on both sides of the fuselage 110.

Based on the above structure, the first end 121 of the upper wing 120 and the third end 131 of the lower wing 130 are closed by the first propulsion assembly 140, and the second end 122 of the upper wing 120 and the fourth end 132 of the lower wing 130 are closed by the second propulsion assembly 150. Therefore, the vortex originally generated at the first end 121, the second end 122, the third end 131 and the fourth end 132 almost disappears, thereby reducing the induced drag and increasing the lift of the upper wing 120 and the lower wing 130. In addition, the biplane flying device 100 of this embodiment can also provide improved structural strength due to that the first propulsion assembly 140 is connected to the fuselage 110, the first end 121 of the upper wing 120 and the third end 131 of the lower wing 130, and the second propulsion assembly 150 is connected to the fuselage 110, the second end 122 of the upper wing 120 and the fourth end 132 of the lower wing 130. In addition, the biplane flying device 100 of this embodiment can also have the advantage of stable flight attitude due to that not only the upper wing 120 connected to the fuselage 110 is provided, but also the lower wing 130 connected to the fuselage 110 is provided.

Figure 3:
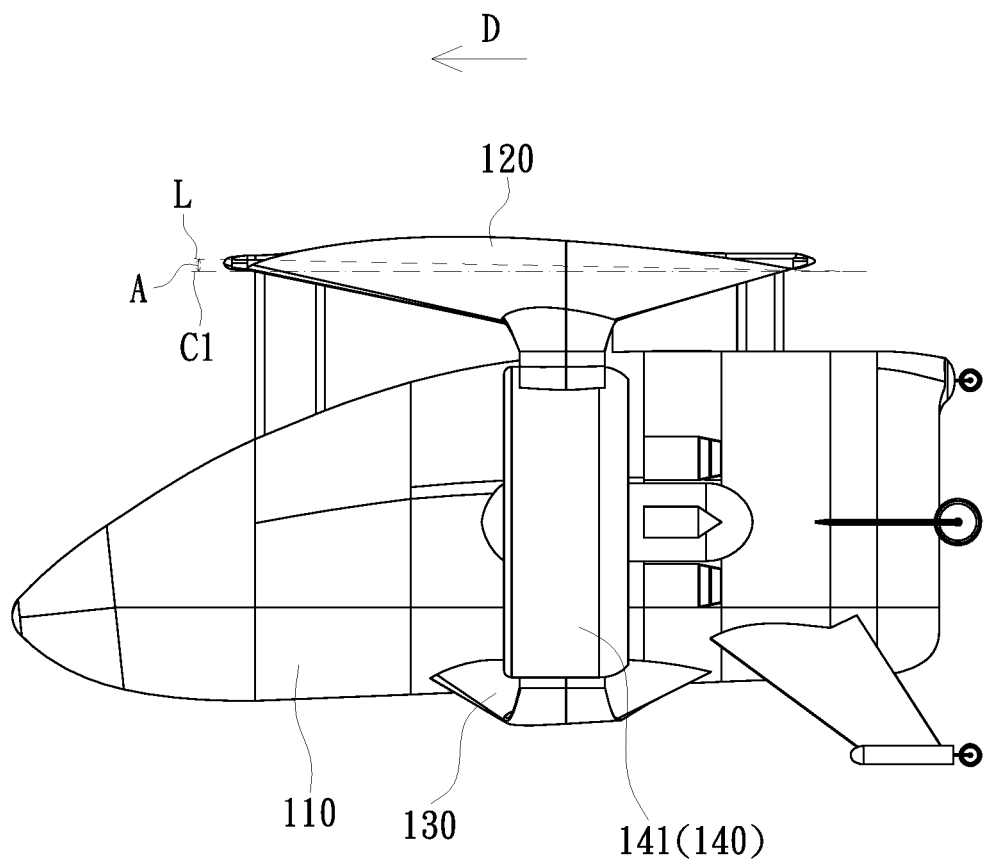
FIG. 3 is a schematic side view of the biplane flying device of FIG. 1.

FIG. 3 is a schematic side view of the biplane flying device of FIG. 1. Please refer to FIGS. 1 and 3 together. The upper wing 120 may further have a chord line L. The first propulsion assembly 140 may have a central axis C1, and the second propulsion assembly 150 may have a central axis C2 (shown in FIG. 1), wherein the central axes C1 and C2 extend in the same direction. The central axes C1 and C2 of this embodiment are, for example, the rotating axes of the fan propellers 141 and 151, respectively, but not limited thereto. As shown in FIG. 3, there is an angle A between the chord line L and any of the central axes C1 and C2, wherein the central axis C1 is taken as an example in FIG. 3. The chord line L rises toward the direction D away from the fuselage 110, wherein the direction D is defined as a direction from the trailing edge of the upper wing 120 to the leading edge of the upper wing 120. Specifically, the angle A is, for example, between 4 and 6 degrees. As such, the upper wing 120 can generate an angle of attack of 4-6 degrees when the biplane flying device 100 is flying in a horizontal attitude, thereby increasing the lift when the biplane flying device 100 is flying in a horizontal attitude.

Figure 4:
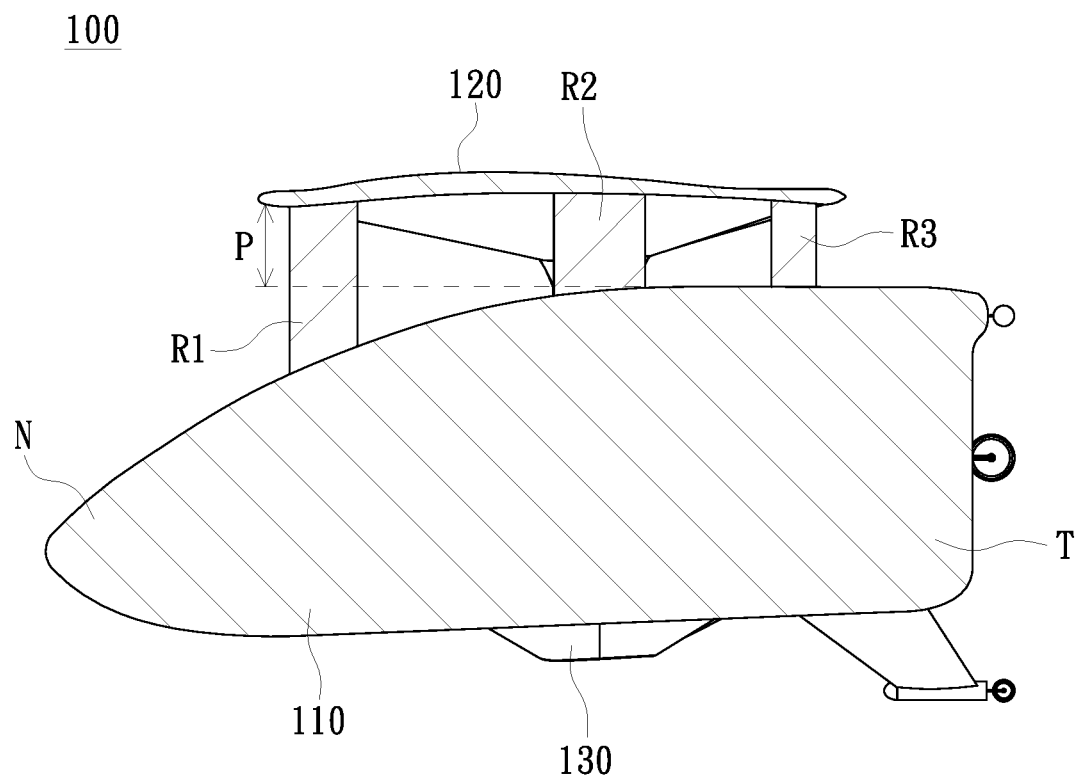
FIG. 4 is a schematic cross-sectional view of the biplane flying device, taken along the line A-A in FIG. 1.

FIG. 4 is a schematic cross-sectional view of the biplane flying device, taken along the line A-A in FIG. 1. Please refer to FIG. 4. The biplane flying device 100 may further include at least one wing-connecting member, and this embodiment takes three wing-connecting members R1, R2 and R3 as an example, but is not limited thereto. The wing-connecting members R1, R2 and R3 are connected between the fuselage 110 and the upper wing 120 to fix and strengthen the structural stability of the upper wing 120. In addition, the wing-connecting members R1, R2 and R3 keep a distance P between the fuselage 110 and the upper wing 120. Therefore, the airflow flowing through the upper wing 120 can avoid interference from the airflow flowing through the fuselage 110 when the biplane flying device 100 is flying, so as to further improve the stability of the biplane flying device 100 and increase the lift of the upper wing 120. In this embodiment, the length of each of the wing-connecting members R1, R2 and R3 can be adjusted according to the shape of the fuselage 110. For example, the length of the wing-connecting member R1 near the nose N may be greater than the distance P, and the length of the wing-connecting member R3 near the tail T can be approximately equal to the distance P. In addition, unlike the upper wing 120, the lower wing 130 of this embodiment is directly connected to the fuselage 110.

Figure 5A:
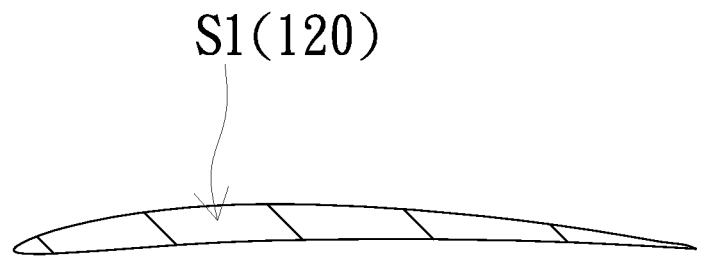
FIG. 5A is a schematic cross-sectional view of the upper wing in FIG. 1.
Figure 5B:
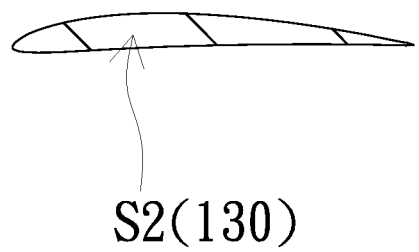
FIG. 5B is a schematic cross-sectional view of the lower wing in FIG. 1.

FIG. 5A is a schematic cross-sectional view of the upper wing in FIG. 1. FIG. 5B is a schematic cross-sectional view of the lower wing in FIG. 1. Please refer to FIGS. 5A and 5B. The upper wing 120 may have an airfoil S1, and the lower wing 130 may have an airfoil S2. In this embodiment, the upper wing 120 and the lower wing 130 may not be flat wings, so the airfoils S1 and S2 each have a curve. Specifically, the airfoils S1 and S2 are, for example, airfoils conforming to the NACA airfoil profile. In this way, by selecting the NACA airfoil capable of increasing the lift-drag ratio of the upper wing 120 and the lower wing 130, the biplane flying device 100 has better and clear flight performance when flying in a horizontal attitude.

Figure 6:
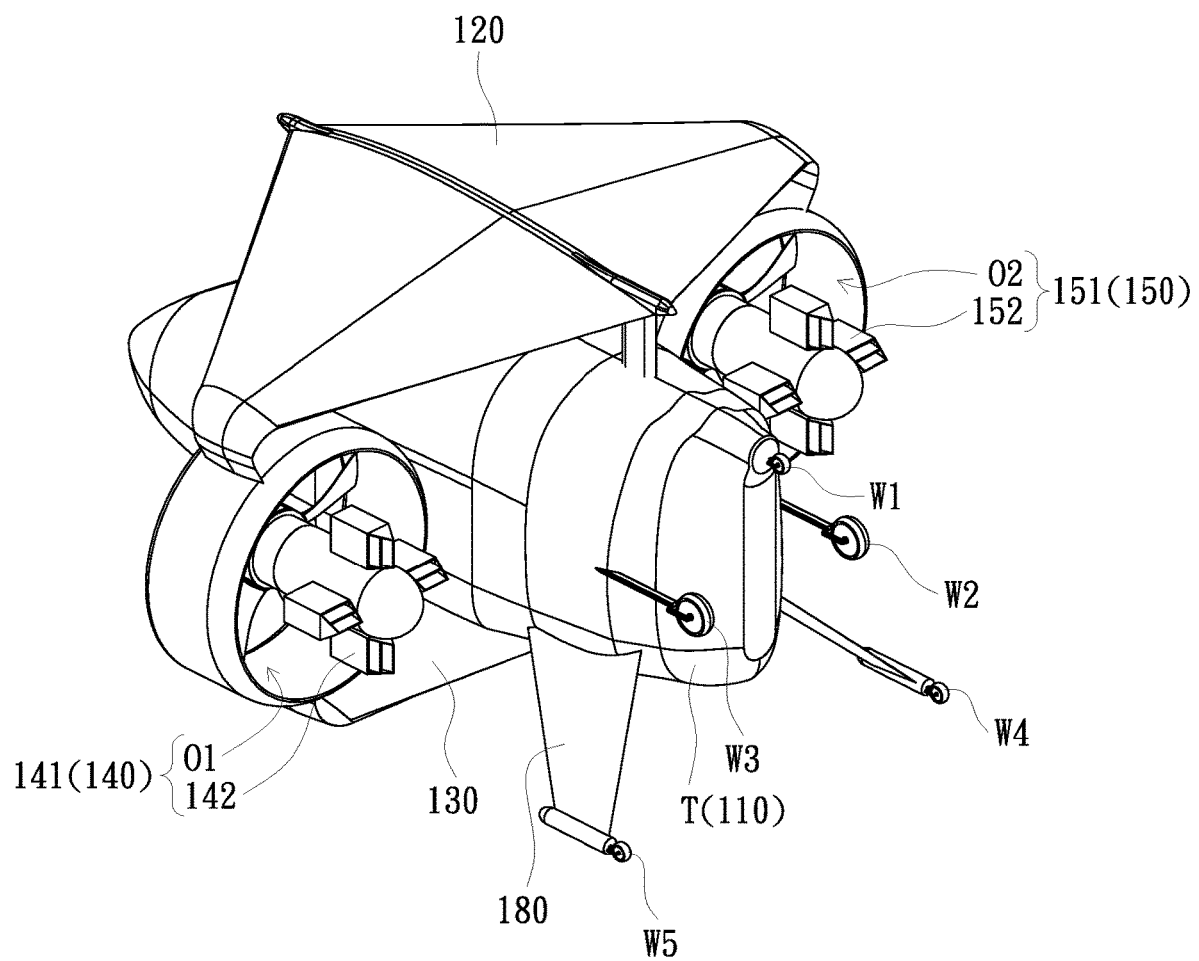
FIG. 6 is a three-dimensional schematic diagram of the biplane flying device of FIG. 1 from another perspective.

FIG. 6 is a three-dimensional schematic diagram of the biplane flying device of FIG. 1 from another perspective. Please refer to FIGS. 1 and 6. In this embodiment, the first propulsion assembly 140 may further include an air guide assembly 142, and the second propulsion assembly 150 may further include an air guide assembly 152. The air guide assembly 142 is disposed at the exhaust port O1 of the fan propeller 141, and the air guide assembly 152 is disposed at the exhaust port O2 of the fan propeller 151. Specifically, the air guide assemblies 142 and 152 can adjust the direction of the air flow out of the exhaust ports O1 and O2 to control the flight attitude or steering of the biplane flying device 100.

Please continue to refer to FIG. 6. The biplane flying device 100 of this embodiment may further include a tail wing 180. The tail wing 180 and the lower wing 130 are located on the same side of the fuselage 110 and the tail wing 180 is located at the tail T of the fuselage 110. The tail wing 180 is configured to further improve the stability of the biplane flying device 100 during the horizontal flight. In addition, the biplane flying device 100 may further include a plurality of wheels W1, W2, W3, W4 and W5, which are disposed on the tail T of the fuselage 110 and the tail wing 180. Specifically, the wheels W1, W2 and W3 are disposed on the tail T of the fuselage 110, and the wheels W4 and W5 are disposed on the tail wing 180. Further, because the biplane flying device 100 takes off and landing in an attitude perpendicular to the ground, the wheels W1, W2, W3, W4 and W5 allow the biplane flying device 100 to move on the ground after landing.

In summary, by being provided with not only the upper wing connected to the fuselage but also the lower wing connected to the fuselage, the biplane flying device of the present invention can have the advantage of stable flight attitude. In addition, the first propulsion assembly is connected to the fuselage, the first end of the upper wing and the third end of the lower wing, and the second propulsion assembly is connected to the fuselage, the second end of the upper wing and the fourth end of the lower wing; therefore, the biplane flying device of the present invention can also provide improved structural strength. In addition, the first end of the upper wing and the third end of the lower wing are closed by the first propulsion assembly, and the second end of the upper wing and the fourth end of the lower wing are closed by the second propulsion assembly; therefore, the vortex generated at the first end, the second end, the third end and the fourth end is reduced, thereby reducing the induced drag and increasing the lift of the upper and lower wings of the biplane flying device of the present invention.

Incidentally, the biplane flying device of the present invention has a vertical take-off and landing (VTOL) flying function (e.g., rotary-wing aircraft) and a flying function capable of turning the entire aircraft into a level high-speed (e.g., fixed-wing aircraft). Therefore, the biplane flying device of the present invention can fly vertically when required to fly in areas with dense buildings and narrow spaces; alternatively, the biplane flying device of the present invention can be turned into a level high-speed when flying in open areas or long distances, wherein the flying speed may exceed 300 km/h. In addition, because the biplane flying device of the present invention has double wings (i.e., upper and lower wings) and the ends of the upper wing and the ends of the lower wing are connected with the first propulsion assembly and the second propulsion assembly, the structural strength and rigidity of the biplane flying device are enhanced, the lift and the flight stability of the biplane flying device are increased when flying horizontally, and the biplane flying device of the present invention can have more stable and smooth flight during the attitude transition. The currently known vertical lift aircraft or fixed-wing aircraft cannot have the above-mentioned technical advantages of the present invention at the same time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A biplane flying device, comprising:
a fuselage;
an upper wing, connected to one side of the fuselage, wherein the upper wing has a first end and a second end opposite to each other;
a lower wing, connected to the fuselage and opposite to the upper wing, wherein the lower wing has a third end and a fourth end opposite to each other, the first end is opposite to the third end, and the second end is opposite to the fourth end;
a first propulsion assembly, connected between the first end, the third end and the fuselage; and
a second propulsion assembly, connected between the second end, the fourth end and the fuselage;
wherein the first end, the second end, the third end and the fourth end each have an arc-shaped wingtip structure, the arc-shaped wingtip structures at the first end and the third end are respectively bent toward the first propulsion assembly and connected to the first propulsion assembly, and the arc-shaped wingtip structures at the second end and the fourth end are respectively bent toward the second propulsion assembly and connected to the second propulsion assembly; and
the biplane flying device further comprises a first connecting member and a second connecting member, wherein the first connecting member is connected between the fuselage and the first propulsion assembly, and the second connecting member is connected between the fuselage and the second propulsion assembly.

2. The biplane flying device according to claim 1, wherein the upper wing further has a chord line, the first propulsion assembly and the second propulsion assembly each have a central axis, there is an angle between the chord line and any of the central axes, and the chord line rises in a direction away from the fuselage, wherein the direction is defined as from a trailing edge of the upper wing to a leading edge of the upper wing.

3. The biplane flying device according to claim 2, further comprising at least one wing-connecting member connected between the fuselage and the upper wing, wherein the at least one wing-connecting member keeps a distance between the fuselage and the upper wing, and the lower wing is directly connected to the fuselage.

4. The biplane flying device according to claim 1, wherein the upper wing and the lower wing each have an airfoil, and the airfoils each have a curve.

5. The biplane flying device according to claim 1, wherein the upper wing further comprises an aileron on a side of the upper wing close to a tail of the fuselage.

6. The biplane flying device according to claim 1, wherein the first propulsion assembly and the second propulsion assembly each comprises a fan propeller and an air guide assembly, the air guide assembly is disposed at an exhaust port of the respective fan propeller, the fan propeller of the first propulsion assembly is connected between the first end, the third end and the fuselage, and the fan propeller of the second propulsion assembly is connected between the second end, the fourth end and the fuselage.

7. The biplane flying device according to claim 1, further comprising a tail wing, wherein the tail wing and the lower wing are located on the same side of the fuselage, and the tail wing is located on a tail of the fuselage.

8. The biplane flying device according to claim 7, further comprising a plurality of wheels disposed on the tail of the fuselage and the tail wing.

* * * * *